United States Patent
Bishop

(10) Patent No.: US 9,779,490 B2
(45) Date of Patent: Oct. 3, 2017

(54) DEFECTIVE PIXEL FIXING

(71) Applicant: Imagination Technologies Limited, Kings Langley (GB)

(72) Inventor: Michael Bishop, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/571,591

(22) Filed: Dec. 16, 2014

(65) Prior Publication Data

US 2015/0170376 A1 Jun. 18, 2015

(30) Foreign Application Priority Data

Dec. 18, 2013 (GB) .................................. 1322450.6

(51) Int. Cl.
*G06T 5/00* (2006.01)
*H04N 5/367* (2011.01)
*H04N 9/04* (2006.01)

(52) U.S. Cl.
CPC ............. *G06T 5/005* (2013.01); *H04N 5/367* (2013.01); *H04N 5/3675* (2013.01); *H04N 9/045* (2013.01); *G06T 2207/10024* (2013.01)

(58) Field of Classification Search
CPC .......... G06T 2207/20182; G06T 5/001; G06T 5/005; G06T 3/4015; G06T 5/002; G06T 5/003; G06T 2207/30168; H04N 9/045; H04N 5/367; H04N 5/3675; H04N 2209/046; H04N 2209/049
See application file for complete search history.

(56) References Cited

U.S. PATENT DOCUMENTS

| | | | |
|---|---|---|---|
| 6,747,697 B1 * | 6/2004 | Lin ........................... | G06T 5/20 250/559.04 |
| 6,781,626 B1 * | 8/2004 | Wang .................... | H04N 9/045 348/222.1 |
| 7,446,756 B2 * | 11/2008 | Brosnan ................ | G06F 3/0317 345/104 |
| 7,460,688 B2 * | 12/2008 | Stanback ............... | H04N 5/367 348/246 |
| 7,477,781 B1 * | 1/2009 | Tanbakuchi ........... | H04N 5/367 382/167 |

(Continued)

FOREIGN PATENT DOCUMENTS

EP 1401196 A1 3/2004

*Primary Examiner* — Jingge Wu
(74) *Attorney, Agent, or Firm* — Vorys, Sater, Seymour and Pease LLP; Vincent M DeLuca

(57) ABSTRACT

Methods of fixing defective pixels are described wherein a predicted value for a target pixel in a target color channel is determined based on the values of nearby pixels, wherein the target pixel value can be selectively replaced with the predicted value. The predicted value is determined by determining a candidate value for each of a plurality of directions using: (i) a gradient of pixel values in one color channel along the respective direction and (ii) a pixel value of a pixel in the target color channel which is aligned with the target pixel along the respective direction. Using gradients can provide better predicted values than averaging nearby pixel values since rates of change of pixel values are taken into account. The median of the candidate values may be used in order to reduce the impact of other defective pixels on the predicted value for the target pixel.

19 Claims, 8 Drawing Sheets

(56) References Cited

U.S. PATENT DOCUMENTS

| | | | | |
|---|---|---|---|---|
| 7,564,491 B2* | 7/2009 | Yoneda | ............... | H04N 9/045 348/246 |
| 8,077,228 B2* | 12/2011 | Hung | ............... | H04N 5/367 348/222.1 |
| 2004/0051798 A1* | 3/2004 | Kakarala | ............... | H04N 5/367 348/246 |
| 2006/0239580 A1 | 10/2006 | Diericks | | |
| 2008/0075394 A1* | 3/2008 | Huang | ............... | G06T 3/4015 382/300 |
| 2011/0090371 A1* | 4/2011 | Cote | ............... | H04N 5/2176 348/237 |
| 2012/0230591 A1* | 9/2012 | Shibata | ............... | G06T 5/005 382/195 |
| 2012/0250992 A1* | 10/2012 | Murao | ............... | H04N 9/045 382/167 |
| 2012/0288192 A1* | 11/2012 | Heidrich | ............... | G06T 5/005 382/167 |
| 2013/0051665 A1* | 2/2013 | Shinozaki | ............... | G06T 5/00 382/167 |
| 2013/0128123 A1* | 5/2013 | Rifkah | ............... | G06T 5/002 348/607 |
| 2013/0321675 A1* | 12/2013 | Cote | ............... | H04N 9/64 348/242 |
| 2013/0321679 A1* | 12/2013 | Lim | ............... | H04N 5/23229 348/256 |
| 2015/0213579 A1* | 7/2015 | Alacoque | ............... | G06T 3/4053 382/300 |

\* cited by examiner

DEFECTIVE PIXEL FIXING

BACKGROUND

Image sensors are used to sense light at an array of different pixel positions in order to capture an image representing a scene. Some examples of types of image sensors are complementary metal-oxide-semiconductor (CMOS) image sensors and charge-coupled device (CCD) image sensors. Colour filters may be used such that the different pixels represent intensities in different colour channels. However, image sensors may have some defective pixels which do not have the normal (i.e. expected) photometric response. Defective pixels may be seen in an image as pixels which have incorrect colour, i.e. a different colour to that which a pixel would have if it was not defective.

A pixel may be defective for a number of different reasons, such as a fault with the particular pixel's sensor site or a fault with a transistor which is used to process data for the pixel. Furthermore, a fault may affect a cluster of pixels or a column of pixels.

Defective pixel fixing can be applied to image data, whereby pixel values of defective pixels are replaced with predictions of correct pixel values. A "correct" pixel value in this sense is a pixel value that the pixel would have if it was not defective.

There are two stages to methods of defective pixel fixing: (i) determine which pixels are defective, and (ii) replace the defective pixel values with predicted pixel values. Some manufacturers of image sensors will test each image sensor that is manufactured and provide a defective pixel map for each image sensor which indicates pixels which are determined to be defective in the test. When a defective pixel map is available, the pixel values of pixels indicated by the defective pixel map may be replaced by predictions of those pixel values. The predicted value of a defective pixel may be based on the pixel values surrounding the defective pixel, e.g. the prediction may be a copy of the value of a pixel which is adjacent to the defective pixel or an average of several adjacent pixel values.

Defective pixel maps can be good for determining which pixels are defective in some situations. However, some causes of defective pixels are transient, such that the defective pixels may change over time. A defective pixel map provides an indication of which pixels are defective at the time at which the image sensor is tested, but the defective pixel map is not subsequently changed. Therefore, after some time, a defective pixel map might not be completely accurate in indicating which pixels are defective.

Furthermore, some image sensor manufacturers might not provide a defective pixel map for an image sensor. Therefore, it may be useful to determine which pixels are defective without relying on a defective pixel map.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of applying defective pixel fixing to image data which comprises pixel values for a regular array of pixels in a plurality of colour channels, wherein the method comprises, for a target pixel in a target colour channel: for each of a plurality of directions which intercept the target pixel: (a) determining a gradient of pixel values in one of said colour channels along said direction; and (b) determining a candidate value for the target pixel using: (i) the determined gradient, and (ii) a pixel value of a pixel in the target colour channel which is aligned with the target pixel along said direction; determining a predicted value for the target pixel using the plurality of candidate values determined for the respective plurality of directions; and selectively replacing the target pixel value with the predicted value.

There is provided a defective pixel fixing unit configured to apply defective pixel fixing to image data which comprises pixel values for a regular array of pixels in a plurality of colour channels, wherein one of the pixels is a target pixel in a target colour channel, wherein the defective pixel fixing unit comprises a processing module which comprises: a candidate module configured to, for each of a plurality of directions which intercept the target pixel: (a) determine a gradient of pixel values in one of said colour channels along said direction; and (b) determine a candidate value for the target pixel using: (i) the determined gradient, and (ii) a pixel value of a pixel in the target colour channel which is aligned with the target pixel along said direction; a prediction module configured to determine a predicted value for the target pixel using the plurality of candidate values determined for the respective plurality of directions; and a selection module configured to selectively replace the target pixel value with the predicted value.

There may also be provided computer readable code adapted to perform the steps of any of the methods described herein when the code is run on a computer. Furthermore, there may be provided computer readable code for generating a defective pixel fixing unit according to any of the examples described herein. A computer readable storage medium may have the computer readable code encoded thereon.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
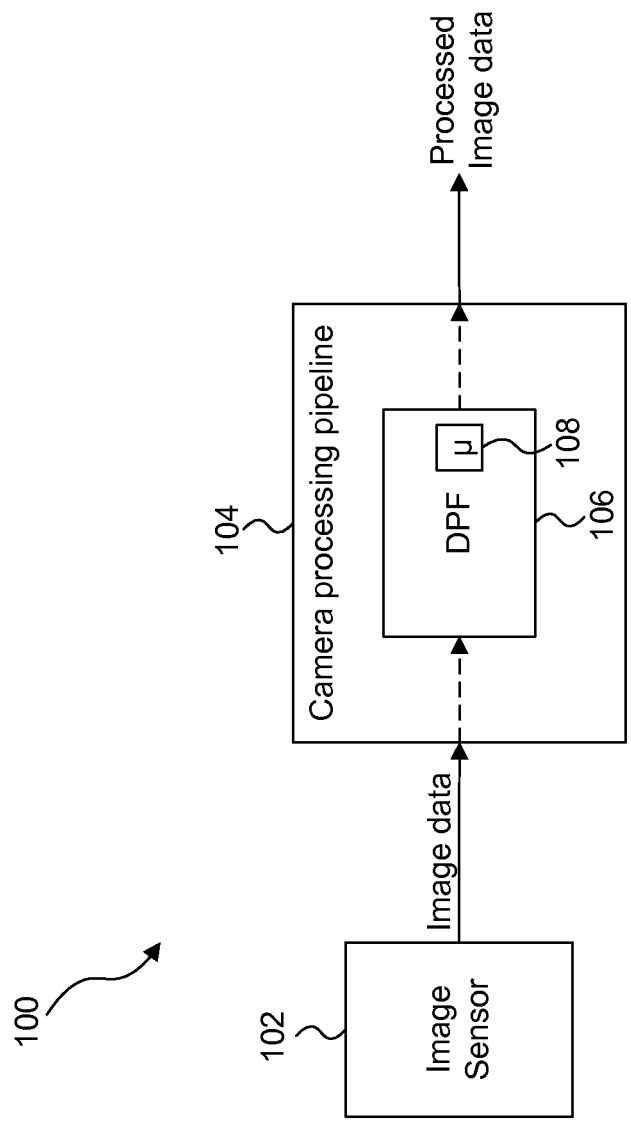
FIG. 1 is a schematic diagram of an image processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Methods of fixing defective pixels in an image are described herein wherein a predicted value for a target pixel in a target colour channel is determined based on the values of other pixels in the image, wherein the target pixel value can be selectively replaced with the predicted value. In examples described herein, the predicted value is determined by determining a candidate value for each of a plurality of directions using: (i) a gradient of pixel values in one colour channel along the respective direction and (ii) a pixel value of a pixel in the target colour channel which is aligned with the target pixel along the respective direction. Using gradients can provide better predicted values than averaging nearby pixel values since the gradients allow rates of change of pixel values to be taken into account when determining the predicted values. The median of the candidate values may be used in order to reduce the impact of outliers (e.g. caused by other defective pixels) on the predicted value for the target pixel.

FIG. 1 shows an image processing system 100 which includes an image sensor 102 and a camera processing pipeline 104. The image processing system 100 may be implemented in a device, such as a camera. The image sensor 102 is configured to capture image data and provide the image data to the camera processing pipeline 104. The image sensor 102 may capture a sequence of images, which can then be used to represent frames of a video sequence. The image data may be in one of many different possible formats, for example the pixel values may comprise Red, Green or Blue (RGB) values to represent the intensity of the respective three colour channels at the respective pixel positions.

The camera processing pipeline 104 comprises a number of processing units for applying processing to the image data, including a defective pixel fixing (DPF) unit 106. Processed image data is output from the camera processing pipeline 104, and may be used in any suitable manner, e.g. output to a display, stored in memory, etc. The defective pixel fixing unit 106 comprises a processing module 108 which is configured to apply defective pixel fixing to the image data. The image data received at the defective pixel fixing unit 106 comprises pixel values for a regular array of pixels in a plurality of colour channels. If, for whatever reason, the image data arriving at the camera processing pipeline 104 is not in a suitable format for the defective pixel fixing unit 106 then the image data may be reformatted in the camera processing pipeline 104 before it arrives at the defective pixel fixing unit 106 so that the image data comprises pixel values for a regular array of pixels in a plurality of colour channels. In the examples described below the regular array of pixels comprises a repeating pattern of 2×2 blocks, wherein each 2×2 block comprises an arrangement of pixels from the plurality of colour channels. For example the image data may be 2×2 RGGB Bayer data. The "colour channels" may also be referred to as "colour planes".

Pixel values relating to lines of pixels are processed in the camera processing pipeline 104 as they are received from the image sensor 102, e.g. in raster scan order, line by line.

As described in more detail below in relation to FIGS. 7 and 8, the camera processing pipeline 104 may process multiple lines of pixel data at a time, in parallel.

Figure 2:
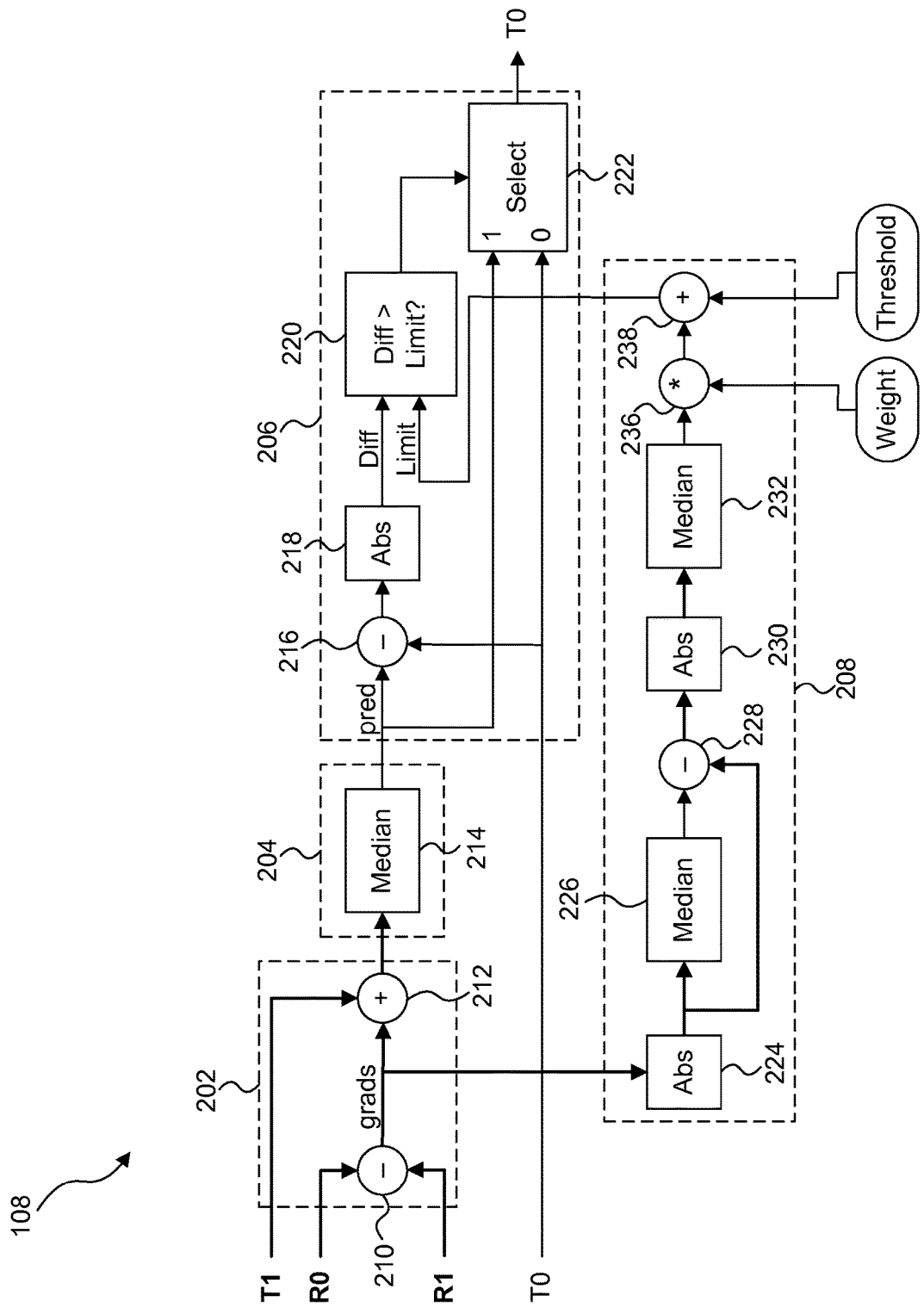
FIG. 2 is a schematic diagram of a processing module of a defective pixel fixing unit in a first example.

FIG. 2 shows a schematic diagram of the processing module 108 of the defective pixel fixing unit 106. The processing module 108 is implemented in hardware in the example shown in FIG. 2, but in other examples the processing module 108 could be implemented in software or a combination of hardware and software. The processing module 108 comprises a candidate module 202, a prediction module 204, a selection module 206 and a limit determining module 208. The candidate module 202 comprises a subtractor 210 and an adder 212. The prediction module 204 comprises a median determining unit 214. The selection module 206 comprises a subtractor 216, an absolute value determining unit 218, a comparator 220 and a select unit 222. The limit determining module 208 comprises a first absolute value determining unit 224, a first median determining unit 226, a subtractor 228, a second absolute value determining unit 230, a second median determining unit 232, a multiplier 236 and an adder 238.

As described in more detail below, the subtractor 210 is arranged to receive a first set of reference pixel values (R0) and a second set of reference pixel values (R1). An output of the subtractor 210 is coupled to an input of the adder 212 and to an input of the absolute value determining unit 224. The adder 212 is also arranged to receive a set of pixel values from a target colour channel (T1). An output of the adder is coupled to an input of the median determining unit 214. An output of the median determining unit 214 is coupled to an input of the subtractor 216 and to a first input of the select unit 222. The subtractor 216 is arranged to receive a target pixel value (T0) at a second input. The select unit 222 is also arranged to receive a target pixel value (T0) at a second input. An output of the subtractor 216 is coupled to an input of the absolute value determining unit 218. An output of the absolute value determining unit 218 is coupled to a first input of the comparator 220. An output of the comparator 220 is coupled to a control input of the select unit 222. The output of the select unit 222 provides an output pixel value for the target pixel. An output of the absolute value determining unit 224 is coupled to an input of the median determining unit 226 and to a first input of the subtractor 228. An output of the median determining unit 226 is coupled to a second input of the subtractor 228. An output of the subtractor 228 is coupled to an input of the absolute value determining unit 230. An output of the absolute value determining unit 230 is coupled to an input of the median determining unit 232. An output of the median determining unit 232 is coupled to an input of the multiplier 236. The multiplier 236 is arranged to receive a "weight" variable at a second input. An output of the multiplier 236 is coupled to a first input of the adder 238. The adder 238 is arranged to receive a "threshold" variable at a second input. An output of the adder 238 is coupled to a second input of the comparator 220.

Figure 3:
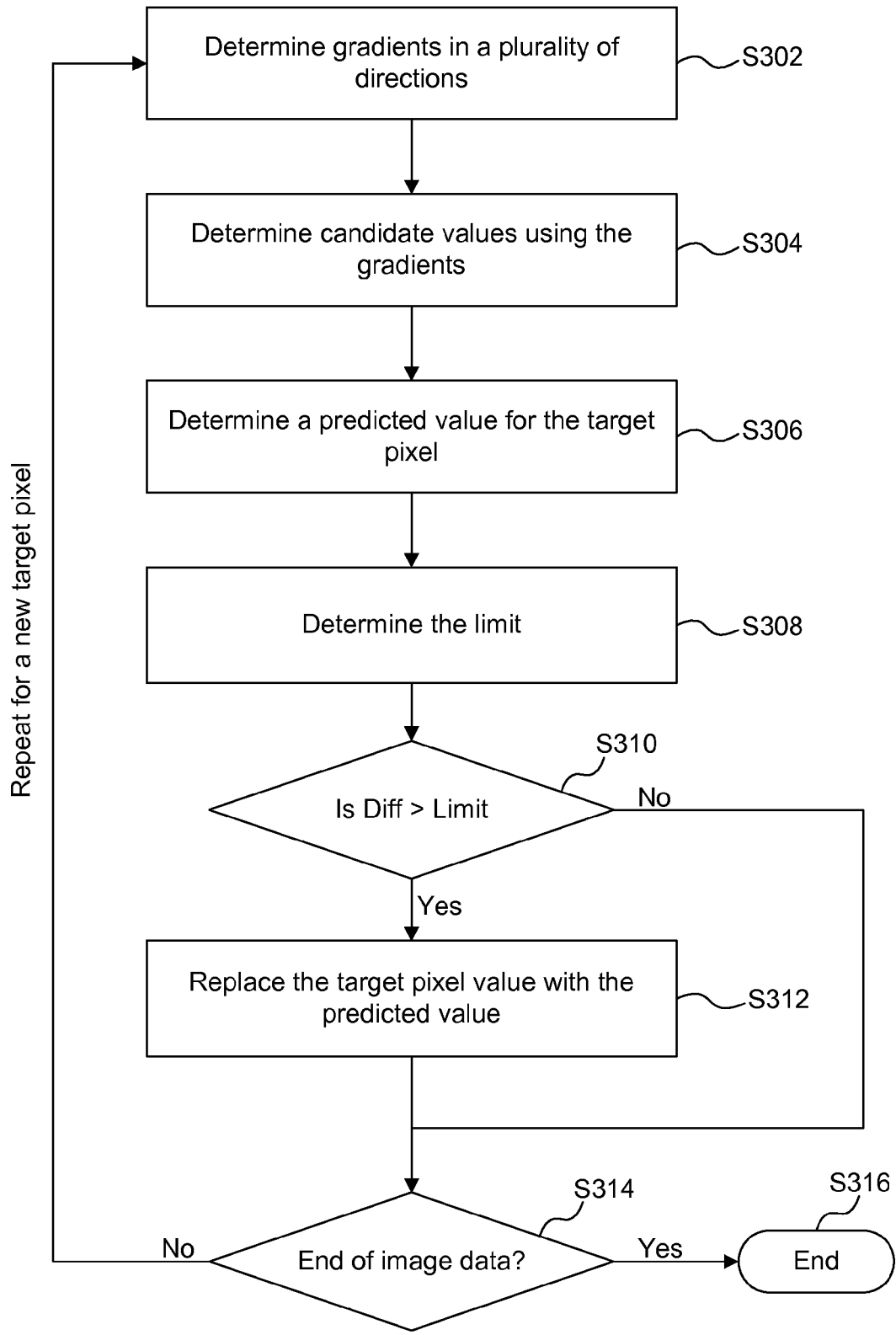
FIG. 3 is a flow chart of for a method of applying defective pixel fixing to image data.
Figure 4:
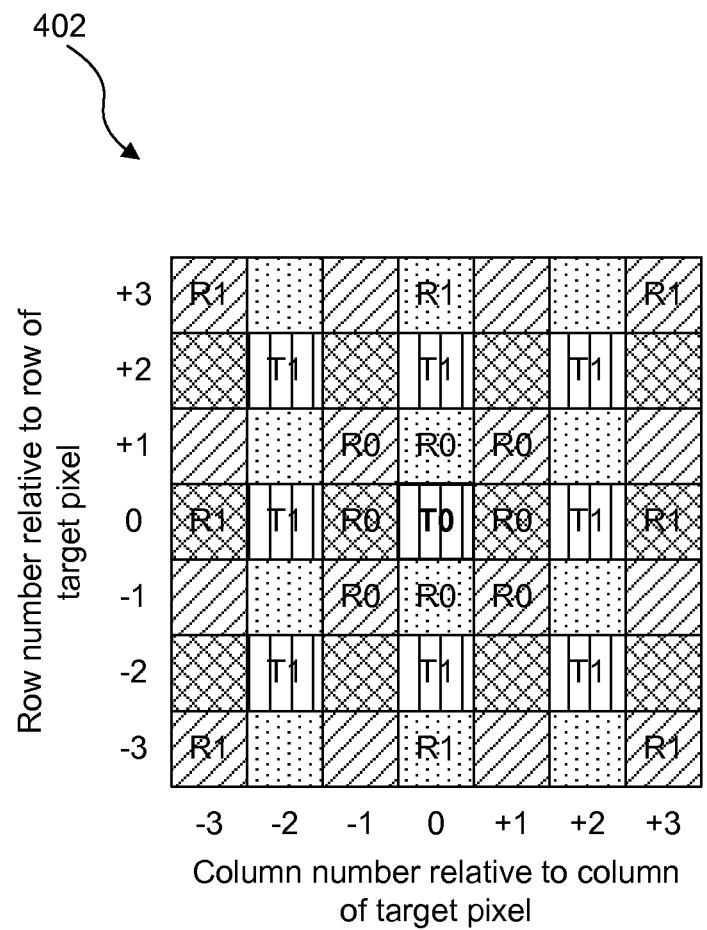
FIG. 4 shows a sub-block of pixels which are used to apply defective pixel fixing to a target pixel.

The operation of the defective pixel fixing unit 106 is described with reference to the flow chart shown in FIG. 3. Pixel values are received at the defective pixel fixing unit 106. The pixel values received at the defective pixel fixing unit 106 may already have had pre-processing applied to them in the camera processing pipeline 104. For example, denoising may be used to reduce the noise in the pixel values. FIG. 4 shows one example of a sub-block of pixels arranged into a regular array. In this example, the image data comprises a repeating pattern of 2×2 blocks, wherein each 2×2 block comprises an arrangement of pixels from the plurality of colour channels. There are four positions within each 2×2 block, which are each shaded differently in FIG. 4, and which each represent a pixel from a particular colour channel. For example the image data may be 2×2 RGGB Bayer data, in which case for each 2×2 block of pixels, one pixel is a red pixel (e.g. the diagonally hatched pixels shown in FIG. 4), two pixels are green pixels (e.g. the dotted and cross-hatched pixels shown in FIG. 4) and one pixel is a blue pixel (e.g. the vertically hatched pixels shown in FIG. 4). In other examples, other arrangements of pixels may be used by using a different colour filter array in the image sensor 104, for example an RGBE filter may be used which is similar to the Bayer data but there is only one green pixel in each 2×2 block and there is an "emerald" pixel in each 2×2 block. As another example, an LRGB filter may be used which is similar to the Bayer data but there is only one green pixel in each 2×2 block and there is a luminance (L) pixel in each 2×2 block which is sensitive only to brightness.

The sub-block of pixels shown in FIG. 4 is a 7×7 sub-block of pixels from the image data which is centred on a target pixel (T0). The target pixel is in a target colour channel (denoted by vertical hashing in FIG. 4). There are eight pixels (denoted R0 in FIG. 4) adjacent to the target pixel (T0) in respective directions. Each of the directions intercepts the target pixel. The directions can be considered to represent eight points on a compass (North, North-east, East, South-East, South, South-West, West and North-West) extending from the target pixel. As can be appreciated in FIG. 4, due to the regular array of pixels from the different colour channels, each of the eight R0 pixels may be in a different colour channel to the target colour channel. A channel containing an R0 pixel may be referred to herein as a reference colour channel. By continuing in each of the directions away from the target pixel, the next pixel beyond the R0 pixel is a pixel in the target colour channel, and is denoted in FIG. 4 as T1. Continuing further in each of the directions away from the target pixel, the next pixel is a pixel in the same colour channel as the R0 pixel for the respective direction, and is denoted in FIG. 4 as R1. Therefore, in each of the directions extending away from the target pixel (T0) there is a set of three pixels including a first reference pixel (R0) in a reference colour channel, a pixel (T1) in the target colour channel and a second reference pixel (R1) in the reference colour channel.

In the example shown in FIG. 4, for each of the directions, the pixel (T1) in the target colour channel which is aligned with the target pixel (T0) is the closest pixel to the target pixel in the target colour channel along the respective direction. Furthermore, in this example, for each of the directions, the pixel values (R0 and R1) in a reference colour channel are pixel values of the closest pixels in the reference colour channel to the target pixel along the respective direction. It is usually beneficial to use the closest pixels to the target pixel for determining a predicted value for the target pixel because the target pixel is likely to be more correlated with pixels which are nearby compared to pixels which are further away. However, it would be possible in other examples to use pixels which are not the closest pixels to the target pixel along the respective directions in order to determine a predicted value for the target pixel. This would usually give a significantly less accurate prediction for the target pixel and would need a larger kernel (with more line stores), but it could be useful if, for example, all of the pixels close to the target pixel are defective.

Due to processing constraints and/or a need to apply the defective pixel fixing to the image data quickly, a 7×7 sub-block of pixels may be the largest practical size for the sub-block of pixels which are considered in order to determine the predicted value for the target pixel T0. In this case, there are not enough pixels in the sub-block in the target colour channel to predict the value of the target pixel T0 using only pixel values from the target colour channel. So, the gradient information in the other colour channels (i.e. the reference colour channels), is used. The inventor has appreciated that there is usually a high degree of local gradient correlation between different colour channels in an image. That is, the gradients of the pixel values in the different colour channels tend to be similar even if the absolute values of the pixel values in the different colour channels are significantly different. The Red, Blue and Green colour channels share the luminance information so changes in the luminance will tend to affect the Red, Blue and Green colour channels to a similar extent. Therefore, it is often the case that the correlation between the intensities of different colour channels is less than the correlation between the gradients of the different colour channels.

For each of the directions, the set of pixels, {R0, T1, R1}, is used to determine a candidate value for the target pixel. In step S302, for each of the directions, the candidate module 202 determines a gradient of the pixel values in the reference colour channel along the respective direction. In the example shown in FIG. 2, the subtractor 210 receives the R0 and R1 values and, for each direction, determines the difference between R0 and R1. The R0 values for the different directions may be received together, e.g. as a vector, at the subtractor 210. Similarly, the R1 values for the different directions may be received together, e.g. as a vector, at the subtractor 210. In this case the subtractor 210 outputs the value of R0−R1 for each of the directions together, e.g. as a vector.

In step S304, for each of the directions, the candidate module 208 determines a candidate value for the target pixel T0 using the determined gradients and the T1 pixel values for each of the directions. The T1 values for the different directions are received together, e.g. as a vector, at the adder 212. In the example shown in FIG. 2, for each of the directions, the adder 212 adds the output of the subtractor 210 (which is the value of R0−R1) to the value of T1. Therefore the adder 212 outputs a candidate value, $cand_i$, for the ith direction which is given by:

$$cand_i = T1_i + R0_i - R1_i. \quad (1)$$

where $T1_i$, $R0_i$ and $R1_i$ are the values of the T1, R0 and R1 pixels for the ith direction. Therefore, in this example, for each of the directions, the step of determining a candidate value for the target pixel comprises using the determined gradient ($R0_i - R1_i$) to extrapolate from the pixel value for the pixel $T1_i$ in the target colour channel along the ith direction to the position of the target pixel. This is represented in FIG. 5.

Figure 5:
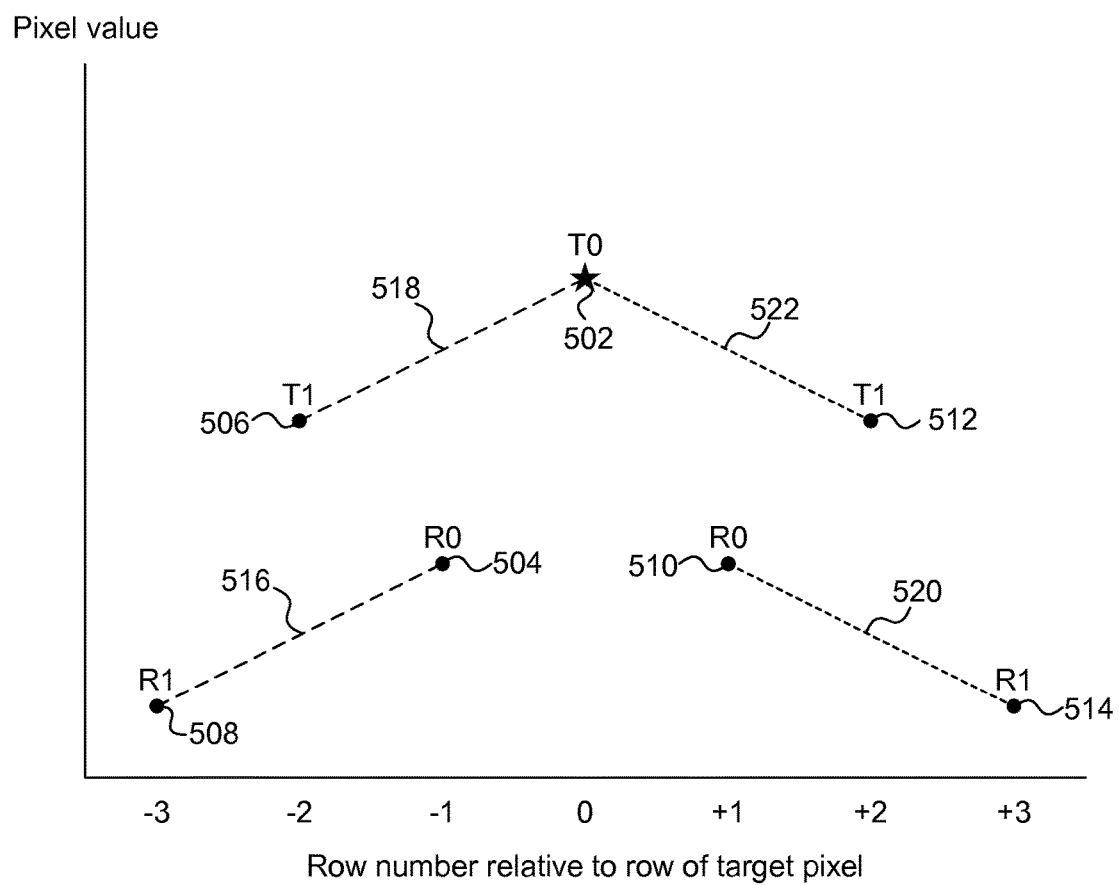
FIG. 5 shows a graph of pixel values in a row of the sub-block.

FIG. 5 shows a graph of pixel values in a row of the sub-block as an example. In particular, FIG. 5 shows a graph of the pixel values in the row of the sub-block which includes the target pixel T0 502. To the left of the target pixel T0 502 there is a first reference pixel R0 504, a pixel in the target colour channel T1 506 and a second reference pixel R1 508. To the right of the target pixel T0 502 there is a first reference pixel R0 510, a pixel in the target colour channel T1 512 and a second reference pixel R1 514. The gradient between the reference pixels 508 and 504 is shown as the dashed line 516. This gradient is used to extrapolate from the T1 pixel value 506 along the line 518 (which has the same gradient as the line 516) to the position of the target pixel 502 to thereby provide a first candidate value for the target pixel based on the values of the three pixels to the left of the target pixel T0: pixels 504, 506 and 508. Similarly, the gradient between the reference pixels 514 and 510 is shown as the dashed line 520. This gradient is used to extrapolate from the T1 pixel value 512 along the line 522 (which has the same gradient as the line 520) to the position of the target pixel 502 to thereby provide a second candidate value for the target pixel based on the values of the three pixels to the right of the target pixel T0: pixels 510, 512 and 514. In the example shown in FIG. 5, the two candidate values for the target pixel agree with each other. In other examples, there may be discrepancies between the candidate values determined for the target pixel T0 from different directions. These discrepancies may be due to errors in some of the pixel values in the 7×7 sub-block or due to approximations used in the process of determining the candidate values (e.g. to assume that the gradient between pixel values in one colour channel will be the same as the gradient between pixel values in another colour channel).

It can be seen in the example shown in FIG. 5 that the candidate values for the target pixel are higher than all of the other pixel values shown in FIG. 5. This is because the gradients are increasing towards the target pixel from both sides. It can be appreciated that using the gradients of the surrounding pixel values can provide a better prediction for the target pixel than other methods of predicting the target pixel value based on the surrounding pixel values. For example, if an average of the surrounding pixel values was used to predict the target pixel value then the predicted pixel value could not be higher than all of the surrounding pixel values, as is the case in the example shown in FIG. 5. Therefore, the use of gradients of pixel values allows a good prediction to be made for the target pixel value even if the target pixel value is the highest pixel value in the local area (e.g. within the 7×7 sub-block). The same is true when the target pixel value is the lowest pixel value in the 7×7 sub-block.

Returning in FIG. 4, it can be appreciated that not all of the pixels in the 7×7 sub-block of pixels are used to determine the candidate values for the target pixel (T0). For example, the pixels shown in FIG. 4 which are not denoted as T0, R0, T1 or R1 (i.e. the pixels which do not lie on one of the eight directions) are not used in the determination of the candidate values for the target pixel.

The candidate values are provided from the adder 212 to the median determining unit 214 of the prediction module 204. In step S306 the prediction module 204 determines a predicted value for the target pixel T0 using the candidate values output from the adder 212. That is, the median determining module determines the median of the candidate values for the different directions, which is then used as a predicted value for the target pixel T0. In this case, the predicted value, pred, for the target pixel T0, is given by:

$$\text{pred}=\text{median}(\text{cand}_i), \text{ for } i=0 \text{ to } D-1. \qquad (2)$$

where D is the number of directions that are considered, e.g. D=8 in the example shown in FIG. 4. In other examples, D may be chosen to be an odd number. By choosing D to be an odd number the determination of the median of the candidate values is simplified since the median of an odd number of values is equal to one of the values, i.e. the middle value. Therefore, the median determining unit 214 does not need to perform any averaging or interpolation to determine the median of the candidate values, and instead simply finds the middle value of the candidate values. For example, D may be chosen to be seven. In this case, one of the eight directions shown in FIG. 4 is not included in the determination of the predicted value. For example, it may be the case that only one of the vertical directions (up and down) from the target pixel T0 is included in the plurality of directions which are used to determine the predicted value. This is because some defects may affect columns of pixels of the image. If this is the case then if both the vertical directions (up and down) were included then they would both give unreliable candidate values for the target pixel because they would both be determined based on pixel values which themselves are corrupted by the column defect. However, if only one of the vertical directions is used, then only one of the candidate values will be corrupted by a column defect. It is noted that defects which affect a column of pixels are more likely than defects which affect non-vertical lines of pixels.

The prediction module 204 uses the median determining unit 214 to determine the predicted value for the target pixel T0 because finding the median is a good way to eliminate outliers in the set of candidate values output from the adder 212. For example, finding the median, rather than finding the mean, is better at discarding outliers of a set of candidate values. Furthermore, finding the median of a set of candidate values is a simple process to implement, which does not use a large amount of processing resources or time, particularly when there is an odd number of candidate values as described above. It can be useful to discard the outliers from the candidate values, because if some of the R0, R1 or T1 pixels in the 7×7 sub-block are defective then the candidate values determined using those defective pixels may be significantly different to the "correct" value for the target pixel (i.e. the value the target pixel would have if it is not defective). Furthermore, the use of the median determining unit 214, as compared to using one candidate value for the predicted value, reduces the significance of individual slope variations and large errors caused by other defects that may be inside the 7×7 sub-block of pixels.

The gradient calculated as (R0–R1) might not be correctly scaled for the target colour channel (unless the different colour channels happen to be at similar intensities, which would happen with grey or white images for example). For colours which are not very saturated, the intensity difference between the different colour channels is not large, so the unscaled gradients (R0–R1) calculated in a reference colour channel may be sufficiently accurate for use in extrapolating from the T1 pixel values to the position of the target pixel T0 in the target colour channel. For very saturated colours, the intensity difference between the different colour channels may be significant, but in this case the difference between gradients in different colour channels will usually be lower, so again the unscaled gradients (R0–R1) calculated in a reference colour channel may be sufficiently accurate for use in extrapolating from the T1 pixel values to the position of the target pixel T0 in the target colour channel. Therefore, in some examples, the gradients calculated for the reference colour channels are used to determine the candidate values as described above, without scaling the gradients. This provides a simple implementation of the candidate module 202. This may be useful, for example when the defective pixel fixing unit 106 is applying defective pixel fixing to the image in real-time as the image is captured by the image sensor 102 because in that case the amount of processing that can be performed on the pixel values may be significantly limited.

In other examples, the gradients calculated for the reference colour channels may be scaled and then used to determine the candidate values. This may sometimes provide more accurate candidate values for predicting the value of the target pixel T0, but will require extra processing compared to not scaling the gradients. For example, when scaling is used, the candidate value for the ith direction, $cand_i$, may be determined according to the equation:

$$cand_i = T1_i + \frac{T1_i}{R1_i}(R0_i - R1_i). \quad (3)$$

This may be achieved by including a multiplier in the candidate module 202 to multiply the output of the subtractor 210 by a factor of $$\frac{T1_i}{R1_i}$$

before providing the input to the adder 212. In this example, the denominator in the fraction which represents the magnitude of the pixel values in the reference colour channel is given as $R1_i$, but in other examples this could be $R0_i$ or an average of $R0_i$ and $R1_i$, or some other suitable quantity which represents the magnitude of the pixel values in the reference colour channel.

In other examples the gradients calculated for the reference colour channels may be scaled only if the saturation of the colours in the image exceeds a threshold. This allows for scaling of the gradients when this is likely to be useful but does not waste processing resources on scaling the gradients when doing so is not likely to provide a significant benefit.

Steps S308 to S312 are implemented to selectively replace the target pixel value with the predicted value. In step S308, a limit is determined by the limit determining module 208. The limit represents the maximum difference between the target pixel value and the predicted value that does not result in the target pixel being considered to be defective, as described in more detail below in step S310. The limit is determined based on a measure of the variation of the gradients determined for the respective plurality of directions. In this way the limit can adapt to changes in the complexity of the image. For example, if the variation of the gradients determined for the respective plurality of directions is small, then the image is reasonably flat and as such small errors in pixel values may be more apparent to a viewer. Therefore, in these cases, a small error in the target pixel value may mean that the target pixel should be considered as defective, and should be replaced with the predicted value, and as such the limit may be relatively low. In contrast, if the variation of the gradients determined for the respective plurality of directions is large, then the image is relatively detailed (or "busy") and as such small errors in pixel values may be less apparent to a viewer. Therefore, in these cases, a small error in the target pixel value may mean that the target pixel should not be considered as defective, and should not be replaced with the predicted value, and as such the limit may be relatively high.

In order to determine the limit, first the limit determining module 208 calculates a median of the absolute differences between the gradients and the median of the gradients, which may be referred to as a local Median of Absolute Deviation (MAD). The MAD reflects the variation in the gradients and texture around the target pixel. The MAD is similar to a standard deviation but has a better rejection of outliers which may for example be caused by defects occurring in the pixels of the 7×7 sub-block of pixels.

In order to determine the MAD, the absolute value determining unit 224 finds the absolute values of the gradients outputted from the subtractor 210. That is, the absolute value determining unit 224 determines $|R0_i - R1_i|$ for i=0 to D−1 (i.e. for each of the D directions). The median determining unit 226 then finds the median of the absolute values of the gradients. The subtractor 228 then subtracts the median of the absolute values of the gradients from each of the absolute values of the gradients to provide D outputs to the absolute value determining unit 230. The absolute value determining unit 230 finds the absolute values of the outputs from the subtractor 228. The median determining unit 232 then finds the median of the outputs from the absolute value determining unit 230. Therefore, the output of the median determining unit 232 represents the MAD, i.e. the median of the absolute differences between the absolute values of the gradients and the median of the absolute values of the gradients. In summary, the output of the median determining unit 232, MAD, is given by:

$$MAD = \text{median}(||R0_i - R1_i| - \text{median}(|R0_i - R1_i|)|), \text{ for } i=0 \text{ to } D-1 \quad (4)$$

The MAD is used to determine the limit according to the equation:

$$\text{limit} = \text{threshold} + MAD \times \text{weight} \quad (5)$$

where threshold and weight are variables which can be adapted to thereby adapt the limit. Therefore, the limit is determined as the sum of a threshold value, which does not depend upon the characteristics of the pixels in the sub-block, and a weighted version of the MAD. The values of threshold and weight are provided to the limit determining module 208, e.g. from firmware which controls the adaptation of the limit by controlling the values of threshold and weight.

The multiplier 236 receives the weight variable and multiplies it by the MAD value output from the median determining unit 232. The adder 238 receives the threshold variable and adds it to the output of the multiplier 236 in order to determine the limit in accordance with equation 5 given above.

The selection module 208 receives the target pixel value T0 and also receives the predicted value for the target pixel outputted from the prediction module 204. Furthermore, the limit is provided from the limit determining module 208 to the selection module 206, such that the selection module 206 can selectively replace the target pixel value with the predicted value based on the limit. In order to do this, the subtractor 216 subtracts the predicted value, pred, from the target pixel value T0 and provides the result to the absolute value determining unit 218 which determines the absolute value of the difference, Diff, between the predicted value and the target pixel value, i.e. Diff=|T0−pred|. The comparator 220 receives the values of Diff and Limit and in step S310 the comparator 220 compares the difference with the limit. If the difference is greater than the limit this indicates that the target pixel is characteristic of a defective pixel, and the output from the comparator 220 is high. However, if the difference is not greater than the limit this indicates that the target pixel is not characteristic of a defective pixel, and the output from the comparator 220 is low.

The output from the comparator 220 is received at the control input of the select unit 222. The select unit 222 receives the predicted value, pred, at a first data input and receives the target pixel value, T0, at a second data input. The select unit 222 may for example be implemented as a multiplexer. If the input to the control input of the select unit 222 is high (i.e. if difference is greater than the limit) then in step S312 the select unit 222 outputs the predicted value, such that the target pixel value is replaced with the predicted value. However, if the input to the control input of the select unit 222 is low (i.e. if difference is not greater than the limit) then step S312 is skipped and the select unit 222 outputs the target pixel value, such that the target pixel value is not replaced with the predicted value.

In the example described above, the comparator determines whether Diff>Limit, but as would be apparent to a person skilled in the art, in other examples the comparator could compare Diff and Limit in a different way, e.g. by determining whether Diff≥Limit, or whether Diff<Limit, or whether Diff≤Limit, and the output of the comparator 220 could be adjusted accordingly.

The function of the selection module 206 can be summed up by the pseudo-code:

```
if abs(T0-pred) > Limit then
    T0' = pred
else
    T0' = T0
end if
``` where in the pseudo-code above the input target pixel value is denoted T0, and the output target pixel value is denoted T0'.

It can therefore be appreciated that the processing module 108 determines whether the target pixel, T0, is characteristic of a defective pixel based on the similarity of the target pixel value, T0, and the predicted value, pred. The target pixel value, T0, is selectively replaced with the predicted value, pred, based on the determination as to whether the target pixel is characteristic of a defective pixel. Furthermore, it is noted that the step of replacing the target pixel value, T0, with the predicted value, pred, is a simple step for the select unit 222 because the predicted value, pred, has already been determined and provided to the select unit 222. Therefore, the processing that is performed to determine the predicted value, pred, for the purpose of determining whether a pixel is defective (e.g. in the comparator 220) does not need to be repeated for the purpose of selectively replacing the target pixel value with the predicted value.

As described above, firmware may control the adaptation of the limit by controlling the values of threshold and weight. Information describing how many pixels in an image are replaced by the predicted values in the defective pixel fixing may be reported from the processing module 108 to the firmware. The firmware may have an idea of how many pixels are likely to be defective in an image, and can adjust the values of the threshold and weight variables such that the defective pixel fixing unit replaces approximately the correct number of defective pixels in an image. In this way, the firmware may control the values of threshold and weight using a "slow" control loop. For example, the defective pixel fixing may be applied to a sequence of frames, and the method may comprise analysing the results of applying defective pixel fixing to image data of a first frame of the sequence and adapting the values of the threshold and weight variables based on the analysis in order to adapt the limit for use in applying defective pixel fixing to a second frame of the sequence. The control loop is "slow" in the sense that it responds to feedback from the processing module 108 on a frame-by-frame basis, rather than for different pixels within the same frame.

To give the firmware an idea of how many pixels are likely to be defective in an image, the firmware may have access to a defective pixel map for the image sensor 102. As described above, the defective pixel map indicates which pixels are likely to be defective based on a test of the image sensor 102, e.g. performed by the manufacturer of the image sensor 102. Therefore the defective pixel map provides an indication as to the likely number of pixels which are defective in the image (and also the position of the defective pixels in the image), so if the reported number of defective pixels for an image is significantly different to the likely number then the firmware can adapt the values of the threshold and weight variables accordingly for the application of the defective pixel fixing to a subsequent image captured using the same image sensor 102.

Figure 6:
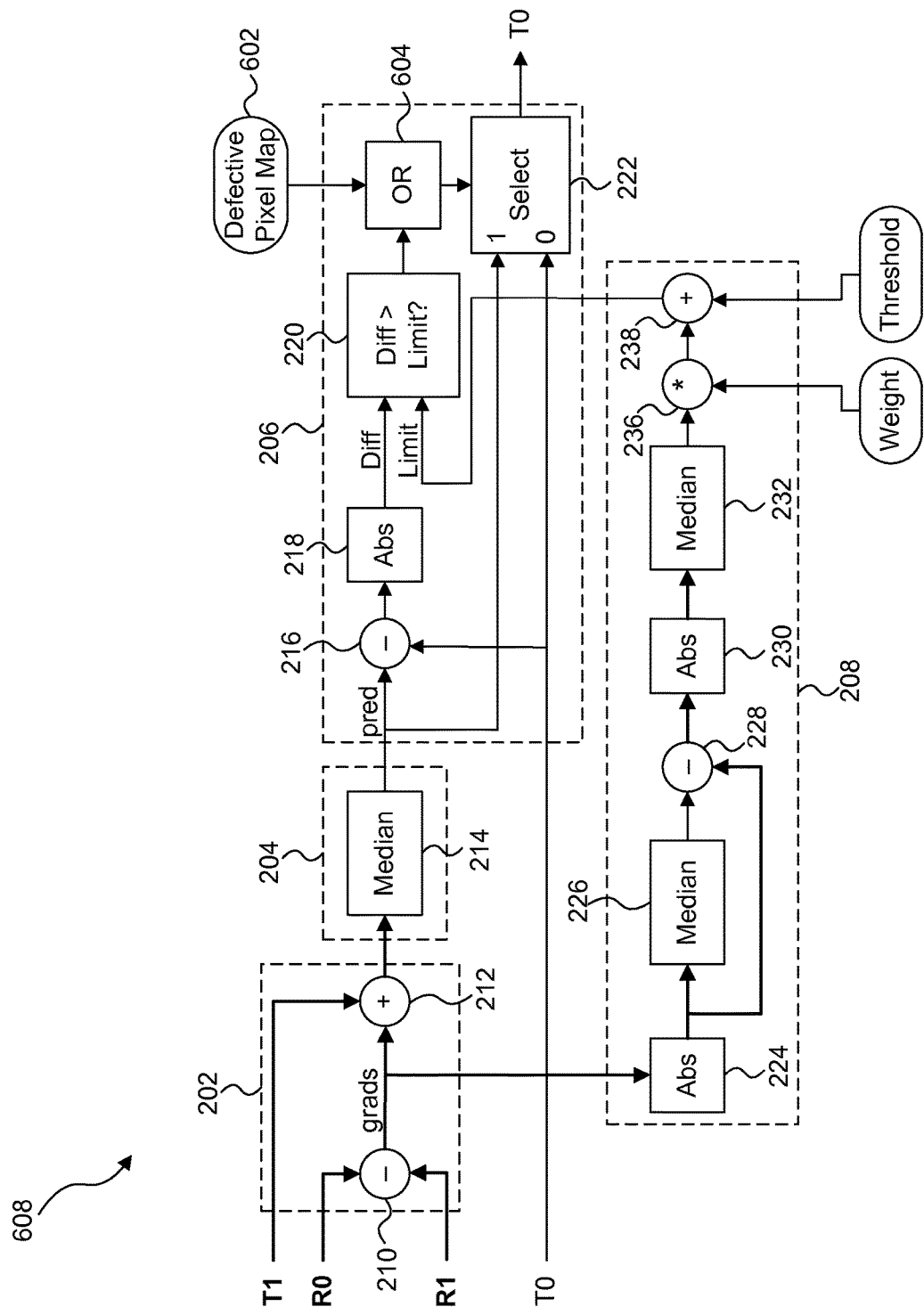
FIG. 6 shows a schematic diagram of a processing module of a defective pixel fixing unit in a second example.

FIG. 6 shows a second example of a processing module 608 which could be implemented in the defective pixel fixing unit 106 which has the same modules and units as the processing module 108 shown in FIG. 2, but with the addition of an OR gate 604 in the selection module 206. The elements of the processing module 608 which are the same as those of the processing module 108 are denoted with the same reference numerals and operate in the same manner as described herein. The OR gate 604 is arranged to receive a signal from the defective pixel map to indicate whether the defective pixel map indicates that the target pixel is a defective pixel and also to receive the output from the comparator 220. If either of the two inputs to the OR gate 604 indicate that the target pixel is defective then the OR gate 604 provides a high signal to the control input of the select unit 222. Therefore, the selection module 206 may selectively replace the target pixel value with the predicted value based on the defective pixel map. The use of the OR gate 604 means that if the output of the comparator 220 indicates that the target pixel is defective then the target pixel value is replaced with the predicted value, irrespective of whether the defective pixel map indicates that the target pixel is likely to be defective. Furthermore, the use of the OR gate 604 means that if the defective pixel map indicates that the target pixel is likely to be defective then the target pixel value is replaced with the predicted value, irrespective of whether the output of the comparator 220 indicates that the target pixel is defective. The OR gate 604 is used (rather than an AND gate) because replacing the target pixel value with the predicted value when the target pixel is not defective is generally less detrimental to the perceived image quality than not replacing the target pixel value with the predicted value when the target pixel is defective. That is, false positives (i.e. determining that the target pixel is defective when it is not defective) are not as detrimental as false negatives (i.e. determining that the target pixel is not defective when it is defective). Furthermore, if an AND gate was used instead of the OR gate 604, it would be impossible to detect defects that weren't already indicated in the defective pixel map.

If there is a discrepancy between the two inputs to the OR gate 604 (i.e. a discrepancy between the pixels which are indicated as being likely to be defective by the defective pixel map and the pixels which are determined to be characteristic of defective pixels based on the similarity of the target pixel value and the predicted value), then the discrepancy may be reported to the firmware and the firmware may update the defective pixel map based on the reported discrepancy. In this way, the firmware can maintain the defective pixel map to account for changes in the defective pixels which may occur after the initial determination of the defective pixel map. The firmware may implement particular rules for updating the defective pixel map. For example, the firmware may wait until a particular pixel has been found to be defective in an image with at least a minimum frequency (e.g. twenty times in 40 frames) before updating the defective pixel map to show that the particular pixel is defective. This is to avoid updating the defective pixel map in response to a false positive in the determination of whether a pixel is defective at the output of the comparator 220. False positives tend not to occur consistently for a particular pixel, so it is unlikely that false positives will occur enough times for a particular pixel for the firmware to change the defective pixel map to show that a pixel is defective if the pixel is not actually defective.

In some examples, the decision as to whether to replace the target pixel value with the predicted value may be based only on the input from the defective pixel map. In that case, the limit determining module 208, the subtractor 216, the absolute value determining unit 218, the comparator 220 and the OR gate 604 might not be implemented in the processing module 608.

When the target pixel value has been outputted from the select unit 222 (after selectively replacing the target pixel value with the predicted value) the method passes to step S314. In step S314 it is determined whether defective pixel fixing has been applied to all of the pixels in the image, i.e. whether the end of the image data for the image has been reached. If defective pixel fixing has been applied to all of the pixels in the image then the method passes to step S316 in which the method ends. However, if defective pixel fixing has not yet been applied to all of the pixels in the image then the method passes back to step S302 and the method is repeated with a new target pixel to thereby apply defective pixel fixing to the new target pixel. The new target pixel may, or may not, be in a different colour channel to the original target pixel.

In the examples described above, the defective pixel unit 106 applies the defective pixel fixing to the pixels of an image in a serial manner. That is, the defective pixel fixing is applied to one target pixel and then a next pixel is treated as the target pixel so that defective pixel fixing can be applied to the next pixel. However, in some examples, the defective pixel fixing is applied to a window of pixel values of the image data, which comprises a plurality of rows of pixel values from the image data, wherein the defective pixel fixing is applied for a target pixel from each of the rows in parallel. For example, the window may comprise eleven rows of pixel values from the image data. Processing multiple rows of pixel values in parallel allows the image data to be processed faster by the defective pixel fixing unit. This may be particularly useful if the image data is to be processed by the defective pixel fixing unit in the camera pipeline 104 in real-time as the image sensor 102 captures the image data.

Figure 7:
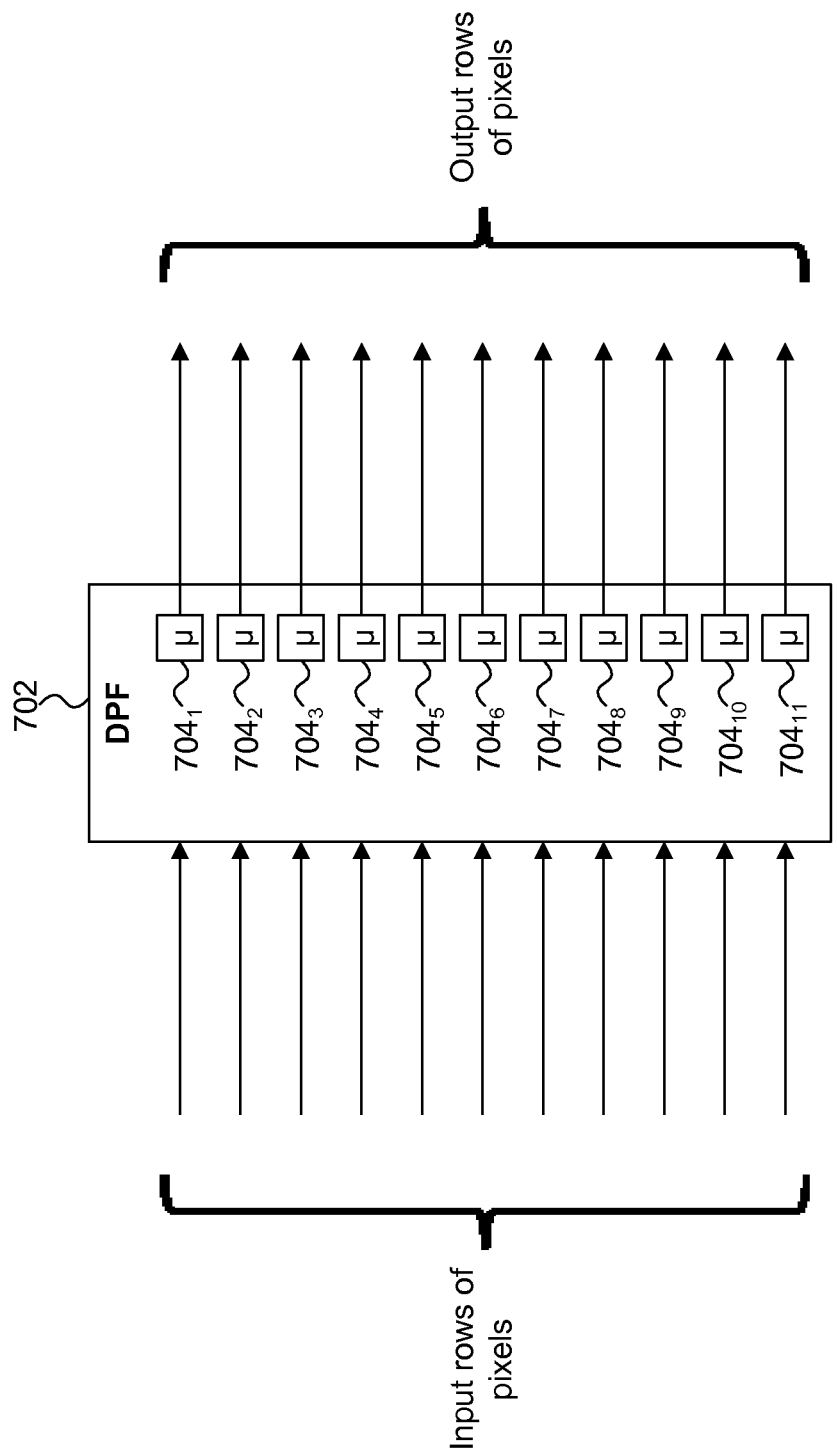
FIG. 7 shows a defective pixel fixing unit configured to apply defective pixel fixing to a plurality of rows of pixels in parallel.

FIG. 7 shows a defective pixel fixing unit 702 which comprises a plurality of processing modules 704, each of which operates in accordance with the descriptions herein of the operation of the processing modules 108 or 608. In the example shown in FIG. 7, the defective pixel fixing unit 702 comprises eleven parallel processing modules $704_1$ to $704_{11}$. The processing modules 704 are configured to apply defective pixel fixing in parallel to respective target pixels from respective rows of pixels in the window. Each of the processing modules 704 centres a 7×7 sub-block of pixels on its respective target pixel in order to perform the defective pixel fixing as described above.

Figure 8:
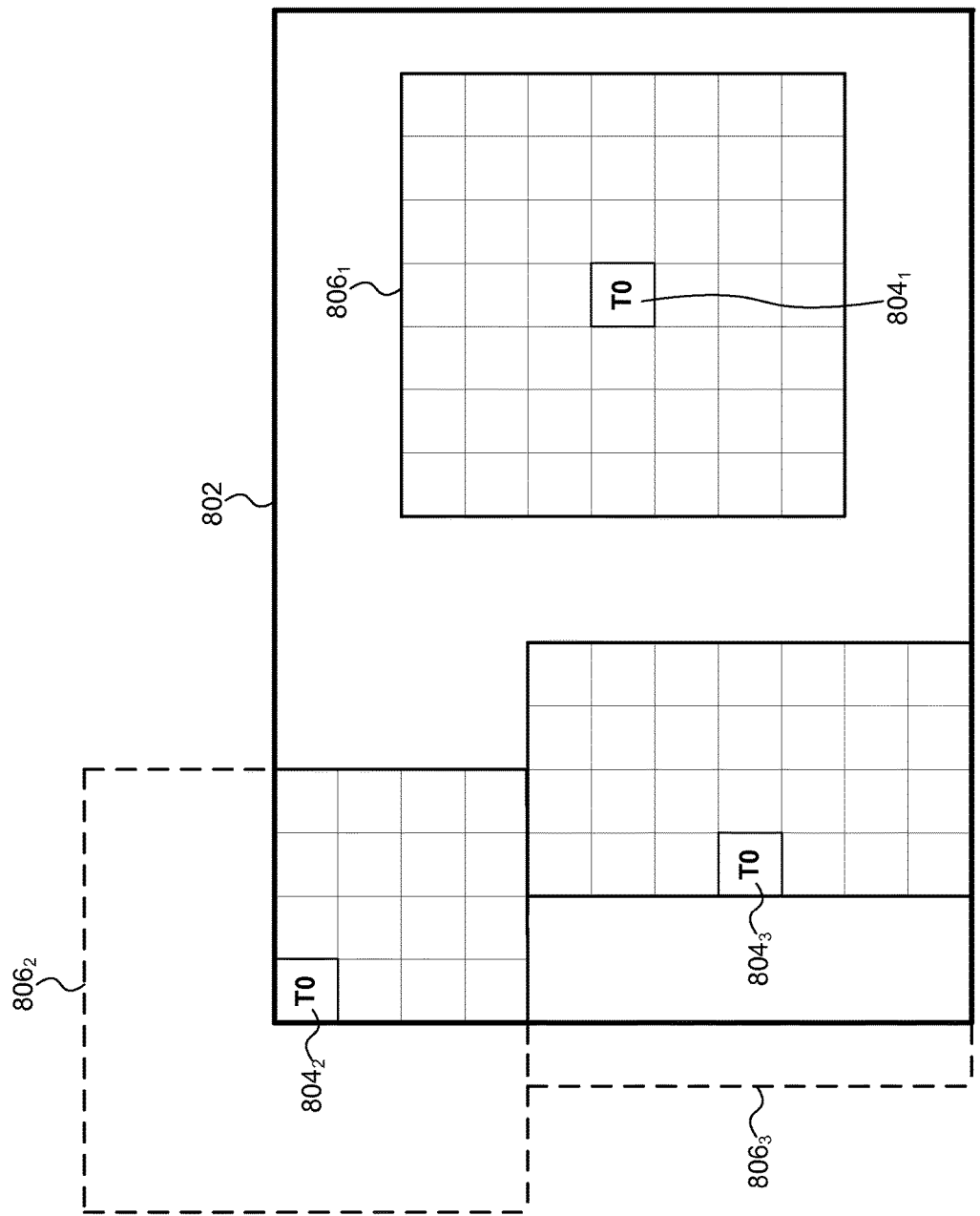
FIG. 8 shows a window of pixel values which are processed in parallel by the defective pixel fixing unit shown in FIG. 7.

FIG. 8 shows the window 802 of pixel values which is received at the defective pixel fixing unit 702 at a particular time. The window 802 comprises eleven rows of pixel values. Each of the processing modules 704 can access the pixel values from the window 802 in order to apply defective pixel fixing to the respective target pixels. FIG. 8 shows a first target pixel $804_1$ in the sixth row of the window 802 for which defective pixel fixing is to be applied by one of the processing modules (e.g. the sixth processing module $704_6$). A 7×7 sub-block of pixels $806_1$ is centred on the target pixel $804_1$. Since the target pixel $804_1$ is not less than three pixels away from any of the edges of the window 802, the sub-block $806_1$ fits entirely within the window 802 when it is centred on the target pixel $804_1$. The processing module $704_6$ uses the sub-block $806_1$ to apply defective pixel fixing to the target pixel $804_1$ as described above.

FIG. 8 also shows a second target pixel $804_2$ in the first row of the window 802 for which defective pixel fixing is to be applied by one of the processing modules (e.g. the first processing module $704_1$). A 7×7 sub-block of pixels $806_2$ is centred on the target pixel $804_2$. As shown in FIG. 8, the target pixel $804_2$ is in the corner of the window 802 and as such the when sub-block $806_2$ is centred on the target pixel $804_2$ it extends outside of the window 802. However, when applying the defective pixel fixing to the target pixel $804_2$ the processing module $704_1$ only has access to the pixel values within the window 802. Therefore the sub-block $806_2$ is cropped such that it does not extend outside of the window 802. Furthermore, the directions from the target pixel in which the sub-block $806_2$ has been cropped are not included in the plurality of directions for which candidate values are determined in step S304 of the method as described above. Therefore, for the target pixel $804_2$ only three directions are considered to determine the candidate values for the target pixel $804_2$. In terms of compass directions, the three directions are East, South-East and South from the target pixel $804_2$. The processing module $704_1$ uses the three directions in the cropped sub-block $806_2$ to apply defective pixel fixing to the target pixel $804_2$ as described above, but with a reduction in the number of directions to three. By calculating fewer candidate values for the target pixel $804_2$ the defective pixel fixing may be less able to cope with errors in the pixel values surrounding the target pixel since there are fewer candidate values to base the prediction of the target pixel value on. This may lead to a slight reduction in accuracy of the predicted value for the target pixel $804_2$ (compared to the accuracy of the predicted value for the target pixel $804_1$). However, the accuracy of the defective pixel fixing applied to the target pixel $804_2$ may be sufficient, and reducing the number of pixels that are considered in the sub-block $806_2$ allows the defective pixel fixing to be applied to the target pixel $804_2$ even though only the pixel values in the window 802 are available to the defective pixel fixing unit 702. Therefore, this allows defective pixel fixing to be applied in parallel to each of the eleven rows of pixel values of the window 802, which can greatly improve the speed at which the defective pixel fixing can be applied to the pixels of an image.

FIG. 8 also shows a third target pixel $804_3$ in the eighth row of the window 802 for which defective pixel fixing is to be applied by one of the processing modules (e.g. the eighth processing module $704_8$). A 7×7 sub-block of pixels $806_3$ is centred on the target pixel $804_3$. As shown in FIG. 8, the target pixel $804_3$ is less than three pixels away from an edge (the left edge in this case) of the window 802 and as such the when sub-block $806_3$ is centred on the target pixel $804_3$ it extends outside of the window 802. Similar to the defective pixel fixing applied to the target pixel $804_2$, when applying the defective pixel fixing to the target pixel $804_3$ the processing module 704₈ only has access to the pixel values within the window 802. Therefore the sub-block 806₃ is cropped such that it does not extend outside of the window 802. Furthermore, the directions from the target pixel in which the sub-block 806₃ has been cropped are not included in the plurality of directions for which candidate values are determined in step S304 of the method as described above. Therefore, for the target pixel 804₃ only five directions are considered to determine the candidate values for the target pixel 804₃. In terms of compass directions, the five directions are North, North-East, East, South-East and South from the target pixel 804₃. The processing module 704₈ uses the five directions in the cropped sub-block 806₃ to apply defective pixel fixing to the target pixel 804₃ as described above, but with a reduction in the number of directions to five. As described above in relation to the target pixel 804₂, there may be a slight reduction in accuracy of the predicted value for the target pixel 804₃ (compared to the accuracy of the predicted value for the target pixel 804₁) due to the reduction in the number of directions that are considered from seven to five. However, this may not be a significant problem and it allows defective pixel fixing to be applied in parallel to each of the eleven rows of pixel values of the window 802, which can greatly improve the speed at which the defective pixel fixing can be applied to the pixels of an image.

It is noted that in the examples described above, an odd number of directions are considered, where the odd number may be three, five or seven depending upon the location of the target pixel within the window 802. It is further noted that any target pixel that is less than three pixels from an edge of the window 802 will lose some directions from the determination of the candidate values because all three pixels (R0, T1 and R1) in a particular direction are used in the method described above to determine a candidate value for that direction.

As shown in the example of FIG. 7, multiple (e.g. eleven) rows of pixels are received in parallel at the defective pixel fixing unit 702 and the same number of rows are output in parallel from the defective pixel fixing unit 702. In other examples, the number of rows output in parallel from the defective pixel fixing unit may be less than the number of rows received in parallel at the defective pixel fixing unit. This may allow the target pixels to be positioned away from the edges of the window, such that the sub-blocks would not be cropped as in the descriptions above for target pixels 804₂ and 804₃, which would allow for a better accuracy in the defective pixel fixing that can be applied compared to outputting the same number of rows as the number of rows that are input into the defective pixel fixing unit. However, this may reduce the speed with which the rows of pixels of an image can be processed by the defective pixel fixing unit (although it would generally still be faster than processing the rows in serial, i.e. outputting one row at a time). The speed with which the defective pixel fixing unit can process the pixels of an image may be particularly important when for example the defective pixel fixing is being applied in the camera pipeline 104 in real-time as the image sensor 102 captures the image data. A device could change the operation mode depending on a trade-off between the importance of processing the pixels quickly and the importance of accuracy in the defective pixel fixing. For example, if the defective pixel fixing unit is processing pixels for a still image and/or if the pixels do not need to be processed in real-time then the number of output rows of the defective pixel fixing unit could be reduced to allow the target pixels to be positioned away from the edges of the window, such that the sub-blocks would not be cropped, thereby increasing the accuracy of the defective pixel fixing. However, if, for example, the defective pixel fixing unit is processing pixels for frames of a video and/or if the pixels need to be processed in real-time then the number of output rows of the defective pixel fixing unit could be higher, e.g. to allow target pixels to be positioned up to the edges of the window, such that more pixels can be processed in each iteration thereby allowing the pixels to be processed faster.

Methods of applying defective pixel fixing described herein are simple to implement such that they can be implemented in real-time as the image sensor 102 captures the image data and passes it to the camera pipeline 104, whilst still providing good results for the defective pixel fixing which can be implemented in hardware. The methods may be able to handle small clusters of defective pixels provided that the clusters do not cover the whole 7×7 sub-block of pixels which is considered for determining a predicted value for a target pixel.

Generally, any of the functions, methods, techniques or components described above can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit, block or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program, which may be encoded on a computer readable storage medium, wherein the computer program comprises computer readable code adapted to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit, block or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, block, unit or logic described above, such as HDL (hardware description language) software, as is used for designing integrated circuits, or for configuring programmable chips, to carry out desired functions. That is, there may be provided computer readable code, and a computer readable storage medium having encoded thereon computer readable code, for generating a defective pixel fixing unit configured to perform any of the methods described herein, or for generating a defective pixel fixing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of applying defective pixel fixing to image data, the image data comprising pixel values for a regular array of pixels in a plurality of colour channels, wherein the method comprises, for a target pixel in a target colour channel of said regular array of pixels, the target pixel having a given pixel value:
   for each of a plurality of directions which intercept the target pixel:
      (a) determining a gradient of pixel values in one of said colour channels along said direction; and
      (b) determining a candidate value for the target pixel using: (i) the determined gradient, and (ii) a pixel value of a pixel in the target colour channel which is aligned with the target pixel along said direction;
   determining the median of the plurality of candidate values determined for the respective plurality of directions, wherein the determined median is used as a predicted value for the target pixel;
   determining whether the target pixel is characteristic of a defective pixel based on the similarity of the given value of the target pixel and the predicted value; and
   selectively replacing the given value of the target pixel with the predicted value based on the determination as to whether the target pixel is characteristic of a defective pixel.

2. The method of claim 1 wherein said step of selectively replacing the given value of the target pixel with the predicted value comprises:
   calculating the difference between the given value of the target pixel and the predicted value; and
   comparing the calculated difference with a limit, wherein if the calculated difference is greater than the limit then the given value of the target pixel is replaced with the predicted value, and if the calculated difference is less than the limit then the given value of the target pixel is not replaced with the predicted value.

3. The method of claim 2 further comprising determining the limit based on a measure of the variation of the gradients determined for the respective plurality of directions.

4. The method of claim 3 further comprising calculating said measure of the variation of the gradients by calculating a median of the absolute differences between the absolute values of the gradients and the median of the absolute values of the gradients.

5. The method of claim 4 wherein the limit is determined according to the equation:

$$\text{limit} = \text{threshold} + \text{MAD} \times \text{weight},$$

where MAD is the median of the absolute differences between the absolute values of the gradients and the median of the absolute values of the gradients, and where threshold and weight are variables which can be adapted to thereby adapt the limit.

6. The method of claim 5 further comprising analysing the results of applying defective pixel fixing to image data of a first frame of a sequence of frames and adapting the values of the threshold and weight variables based on said analysis in order to adapt the limit for use in applying defective pixel fixing to values of a second frame of the sequence.

7. The method of claim 1 wherein, for each of said directions, said pixel in the target colour channel which is aligned with the target pixel is the closest pixel to the target pixel in the target colour channel along the respective direction.

8. The method of claim 1 wherein, for each of said directions, said pixel values in one of said colour channels along the direction for which a gradient is determined are pixel values of the closest pixels in said one of said colour channels to the target pixel along the respective direction.

9. The method of claim 1 wherein said plurality of directions comprises an odd number of directions.

10. The method of claim 1 wherein the regular array of pixels in a plurality of colour channels comprises a repeating pattern of 2×2 blocks, wherein each 2×2 block comprises an arrangement of pixels from the plurality of colour channels of said image data.

11. A defective pixel fixing unit configured to apply defective pixel fixing to image data, the image data comprising pixel values for a regular array of pixels in a plurality of colour channels, wherein one of the pixels is a target pixel in a target colour channel of said regular array of pixels, the target pixel having a given pixel value, wherein the defective pixel fixing unit comprises:
  a candidate module configured to, for each of a plurality of directions which intercept the target pixel:
    (a) determine a gradient of pixel values in one of said colour channels along said direction; and
    (b) determine a candidate value for the target pixel using: (i) the determined gradient, and (ii) a pixel value of a pixel in the target colour channel which is aligned with the target pixel along said direction;
  a prediction module configured to determine a predicted value for the target pixel by determining the median of the plurality of candidate values determined for the respective plurality of directions; and
  a selection module configured to: (i) determine whether the target pixel is characteristic of a defective pixel based on the similarity of the given value of the target pixel and the predicted value, and (ii) selectively replace the given value of the target pixel with the predicted value based on the determination as to whether the target pixel is characteristic of a defective pixel.

12. The defective pixel fixing unit of claim 11 wherein the selection module is configured to:
  calculate the difference between the given value of the target pixel and the predicted value; and
  compare the calculated difference with a limit to determine whether to replace the given value of the target pixel with the predicted value.

13. The defective pixel fixing unit of claim 11 wherein the candidate module is configured to determine a candidate value for the target pixel by using the determined gradient to extrapolate from the pixel value of the pixel in the target colour channel which is aligned with the target pixel along said direction to the position of the target pixel.

14. The defective pixel fixing unit of claim 11 wherein the candidate module is further configured to scale the determined gradient as part of determining a candidate value for the target pixel.

15. The defective pixel fixing unit of claim 11 wherein the selection module is further configured to receive a defective pixel map indicating pixels which are likely to be defective, wherein the selection module is configured to selectively replace the given value of the target pixel with the predicted value is based on the defective pixel map.

16. The defective pixel fixing unit of claim 11 configured to receive a window of pixel values of the image data in parallel, said window of pixel values comprising a plurality of rows of pixel values from the image data, and wherein the defective pixel fixing unit further comprises a plurality of parallel processing modules configured to apply defective pixel fixing in parallel to respective target pixels from a respective plurality of rows of pixels in the window.

17. The defective pixel fixing unit of claim 16 wherein each of the processing modules is configured to use a sub-block of pixel values from the window for applying the defective pixel fixing for a respective target pixel, wherein each of the processing modules is configured to:
  center the sub-block of pixel values on the target pixel; and
  crop the sub-block if, when centered on the target pixel, the sub-block of pixel values extends outside of the window, such that the sub-block does not extend outside of the window, wherein the directions from the target pixel in which the sub-block has been cropped are not included in said plurality of directions.

18. A non-transitory computer readable storage medium having stored thereon computer executable instructions that when executed cause at least one processor to apply defective pixel fixing to image data, the image data comprising pixel values for a regular array of pixels in a plurality of colour channels, the defective pixel fixing being applied for a target pixel in a target colour channel of said regular array of pixels, the target pixel having a given pixel value, by:
  for each of a plurality of directions which intercept the target pixel:
    (a) determining a gradient of pixel values in one of said colour channels along said direction; and
    (b) determining a candidate value for the target pixel using: (i) the determined gradient, and (ii) a pixel value of a pixel in the target colour channel which is aligned with the target pixel along said direction;
  determining the median of the plurality of candidate values determined for the respective plurality of directions, wherein the determined median is used as a predicted value for the target pixel;
  determining whether the target pixel is characteristic of a defective pixel based on the similarity of the given value of the target pixel and the predicted value; and
  selectively replacing the given value of the target pixel with the predicted value based on the determination as to whether the target pixel is characteristic of a defective pixel.

19. A non-transitory computer readable storage medium having stored thereon computer executable instructions that when executed cause at least one processor to generate a defective pixel fixing unit configured to apply defective pixel fixing to image data, the image data comprising pixel values for a regular array of pixels in a plurality of colour channels, wherein one of the pixels is a target pixel in a target colour channel of said regular array of pixels, the target pixel having a given pixel value, comprising:
  a candidate module configured to, for each of a plurality of directions which intercept the target pixel:
    (a) determine a gradient of pixel values in one of said colour channels along said direction; and
    (b) determine a candidate value for the target pixel using the determined gradient, and a pixel value of a pixel in the target colour channel which is aligned with the target pixel along said direction;
  a prediction module configured to determine a predicted value for the target pixel by determining the median of the plurality of candidate values determined for the respective plurality of directions; and
  a selection module configured to: determine whether the target pixel is characteristic of a defective pixel based on the similarity of the given value of the target pixel and the predicted value, and selectively replace the given value of the target pixel with the predicted value based on the determination as to whether the target pixel is characteristic of a defective pixel.

* * * * *